United States Patent
Kim et al.

(10) Patent No.: US 9,771,632 B2
(45) Date of Patent: Sep. 26, 2017

(54) APPARATUS AND METHOD FOR ADSORBING AND DESORBING LITHIUM IONS USING A CCD PROCESS

(75) Inventors: Joon-Soo Kim, Daejeon (KR); Jin-Young Lee, Daejeon (KR); Kyeong-Woo Chung, Daejeon (KR); Hoo-In Lee, Daejeon (KR)

(73) Assignee: KOREA INSTITUTE OF GEOSCIENCE AND MINERAL RESOURCES, Deajeon (KR)

( * ) Notice: Subject to any disclaimer, the term of this patent is extended or adjusted under 35 U.S.C. 154(b) by 1115 days.

(21) Appl. No.: 13/635,132

(22) PCT Filed: Oct. 12, 2011

(86) PCT No.: PCT/KR2011/007594
§ 371 (c)(1),
(2), (4) Date: Sep. 14, 2012

(87) PCT Pub. No.: WO2012/070769
PCT Pub. Date: May 31, 2012

(65) Prior Publication Data
US 2013/0001168 A1    Jan. 3, 2013

(30) Foreign Application Priority Data
Nov. 26, 2010  (KR) ........................ 10-2010-0119159

(51) Int. Cl.
C22B 26/00    (2006.01)
C22B 26/12    (2006.01)
(Continued)

(52) U.S. Cl.
CPC .............. *C22B 26/12* (2013.01); *B01D 15/02* (2013.01); *C02F 1/28* (2013.01); *C22B 3/24* (2013.01); *Y02P 10/234* (2015.11)

(58) Field of Classification Search
None
See application file for complete search history.

(56) References Cited

U.S. PATENT DOCUMENTS 4,043,760 A  8/1977  Hiatt
4,291,001 A  9/1981  Repsher et al.
(Continued)

FOREIGN PATENT DOCUMENTS

JP    2002-88420    3/2002
JP    2002-167626    6/2002
(Continued)

OTHER PUBLICATIONS

Chitrakar et al., "Recovery of Lithium from Seawater Using Manganese Oxide Adsorbent (H1.6Mn1.6O4) Derived from Li1.6Mn1.6O4", Feb. 17, 2001, Ind. Eng. Chem. Res., 40, 2054-2058.*
(Continued)

*Primary Examiner* — Chester Barry
(74) *Attorney, Agent, or Firm* — Hauptman Ham, LLP

(57) ABSTRACT

The present disclosure provides a method for adsorption/desorption of lithium ions from brine, which employs a counter current decantation process in adsorption/desorption of lithium ions, thereby achieving an adsorption rate of 65±5% and a desorption rate of 95±3%. The method includes supplying brine into one of a plurality of adsorption reactors, adsorbing lithium ions to an adsorbent by supplying the adsorbent to the adsorption reactor to which the brine is supplied and forcing the brine and the adsorbent to sequentially flow backwards inside the respective adsorption reactors, and desorbing the lithium ions from the brine by forcing the adsorbent to which the lithium ions are adsorbed to sequentially flow backwards inside a plurality of desorption reactors. Here, the brine and the adsorbent are stirred by a stirrer to maintain the adsorbent in an intermediate state (Continued)

instead of settling or floating inside the respective adsorption reactors.

12 Claims, 3 Drawing Sheets

(51) Int. Cl.
*B01D 15/02* (2006.01)
*C02F 1/28* (2006.01)
*C22B 3/24* (2006.01)

(56) References Cited

U.S. PATENT DOCUMENTS

| | | | | |
|---|---|---|---|---|
| 4,578,163 | A | * | 3/1986 | Kunter .................. C01G 7/003 205/569 |
| 2003/0231996 | A1 | | 12/2003 | Shiu et al. |
| 2004/0074774 | A1 | | 4/2004 | Chang et al. |
| 2006/0213332 | A1 | | 9/2006 | Jarvinen et al. |
| 2011/0174739 | A1 | * | 7/2011 | Chung ..................... C22B 3/02 210/670 |
| 2012/0094364 | A1 | * | 4/2012 | Lali ......................... B01J 8/085 435/283.1 |

FOREIGN PATENT DOCUMENTS

| | | |
|---|---|---|
| JP | 2008126144 A | 6/2008 |
| KR | 10-2005-0103512 | 10/2005 |
| KR | 10-2010-0057520 | 5/2010 |
| WO | 2010035956 A2 | 4/2010 |

OTHER PUBLICATIONS

Chitrakar et al. ("Recovery of Lithium from Seawater Using Manganese Oxide Adsorbent (H1.6Mn1.6O4) Derived from Li1.6Mn1.6O4" Ind. Eng. Chem. Res. Feb. 17, 2001, 40, 2054-2058).*
International Search Report mailed Apr. 17, 2012 for PCT/KR2011/007594.
Deyi Wang et al., Uranium Extracting and Refining Technology, Journal, May 1982, p. 180-182, Atomic Energy Press, Beijing.

* cited by examiner

APPARATUS AND METHOD FOR ADSORBING AND DESORBING LITHIUM IONS USING A CCD PROCESS

CROSS REFERENCE TO RELATED APPLICATION

This application claims the priority of Korean Patent Application No. 10-2010-0119159, filed on Nov. 26, 2010 in the KIPO (Korean Intellectual Property Office). Further, this application is the National Phase application of International Application No. PCT/KR2011/007594 filed Oct 12, 2011, which designates the United States and was published in Korean.

BACKGROUND

1. Technical Field

The present invention relates to a method for adsorption/desorption of lithium ions, and more particularly to a method for adsorption/desorption of lithium ions, which employs a counter current decantation process in adsorption/desorption of lithium ions, thereby enabling efficient and economically feasible extraction of lithium ions from brine.

2. Description of the Related Art

With recent rapid development of mobile phones, notebook computers and electric automobiles, worldwide demand for movable energy sources has rapidly increased.

Particularly, application of secondary lithium batteries is explosively increasing. Currently, the secondary lithium battery industry has been developed centered on Korea, Japan, China, and the like, and a rapid increase in demand for secondary lithium batteries has resulted in a rapid increase in consumption of lithium which is used as an essential raw material for the secondary lithium battery.

In addition, although it is difficult to quantify the amount of lithium ion batteries required for sunlight and wind power plants, it is expected that the sunlight and wind power plants will drive future growth of lithium ion batteries together with green cars. For this reason, lithium will be positioned at the center of the energy revolution which will be led by secondary batteries for the next several dozen years and a technique for effective extraction of lithium ions is thus considered to be inevitable for resource security in view of a long-term policy.

Recently, many studies have been focused on effective extraction of lithium ions from brine.

Brine contains many ionic components such as lithium ions, magnesium ions, sodium ions, chlorine ions, and the like.

A process of extracting lithium ions from brine may include removal of magnesium, adsorption/desorption of lithium ions, and the like.

Here, for adsorption/desorption of lithium ions, an adsorbent is added to brine from which magnesium ions have been removed, to adsorb the lithium ions for a predetermined period of time, and the adsorbent having the lithium ions adsorbed thereto is then subjected to acid treatment using a strong acid solution such as a hydrochloric acid solution to desorb the lithium ions therefrom.

However, such a conventional process for adsorption/desorption of lithium ions requires a long period of time for adsorption/desorption of the lithium ions and can extract a small amount of lithium ions upon adsorption/desorption, thereby providing low yield.

BRIEF SUMMARY

The present invention provides a method for adsorption/desorption of lithium ions, which employs a counter current decantation (CCD) process in adsorption/desorption of lithium ions, thereby enabling efficient and economically feasible extraction of lithium ions from brine.

In accordance with an aspect of the invention, a method for adsorption/desorption of lithium ions using a CCD process includes: supplying brine into one of a plurality of adsorption reactors; adsorbing lithium ions to an adsorbent by supplying the adsorbent to the adsorption reactor to which the brine is supplied, and forcing the brine and the adsorbent to sequentially flow backwards inside the respective adsorption reactors; and desorbing the lithium ions from the brine by forcing the adsorbent to which the lithium ions are adsorbed to sequentially flow backwards inside a plurality of desorption reactors. Here, the brine and the adsorbent are stirred by a stirrer to maintain the adsorbent in an intermediate state instead of settling or floating inside the respective adsorption reactors, after supplying the adsorbent to the adsorption reactor to which the brine is supplied.

The adsorbent may have an average particle size of 1~50 μm.

The adsorbent may include manganese oxide or aluminum oxide.

The manganese oxide may be represented by the following chemical formula: $H_nMn_{2-x}O_4$ (where $1 \leq n \leq 1.33$, $0 \leq x \leq 0.33$, and $n \leq 1+x$).

The desorption of the lithium ions may be performed using a desorbing solution selected from among strong acid solutions including a hydrochloric acid solution, a sulfuric acid solution and a nitric acid solution.

The plurality of adsorption reactors may include first to third adsorption reactors.

The adsorption of the lithium ions may include primarily adsorbing the lithium ions to the adsorbent by forcing the brine and the adsorbent inside the primary adsorption reactor to primarily flow backwards therein; secondarily adsorbing the lithium ions to the adsorbent by supplying a resultant subjected to the primary adsorption into the secondary adsorption reactor and forcing the resultant to secondarily flow backwards therein; and tertiarily adsorbing the lithium ions to the adsorbent by supplying the resultant subjected to the secondary adsorption into the third adsorption reactor and forcing the resultant to tertiarily flow backwards therein.

The plurality of desorption reactors may include first to third desorption reactors.

In accordance with another aspect of the invention, an apparatus for adsorption/desorption of lithium ions using a CCD process includes: a plurality of adsorption reactors connected to each other to force brine and an adsorbent to sequentially flow backwards in each of the adsorption reactors to adsorb lithium ions to the adsorbent; and a plurality of desorption reactors disposed downstream of the plurality of adsorption reactors and connected to each other to force the adsorbent having the lithium ions adsorbed thereto to sequentially flow backwards inside each of the desorption reactors to desorb the lithium ions from the adsorbent when the adsorbent having the lithium ions is supplied to the plurality of adsorption reactors from the plurality of adsorption reactors through connection lines connected to the plurality of adsorption reactors. Here, the brine and the adsorbent are stirred by a stirrer to maintain the adsorbent in an intermediate state instead of settling or floating inside the respective adsorption reactors.

The adsorbent may have an average particle size of 1~50 μm.

The adsorbent may be manganese oxide or aluminum oxide.

The manganese oxide may be represented by the following chemical formula: $H_nMn_{2-x}O_4$ (where $1 \le n \le 1.33$, $0 \le x \le 0.33$, and $n \le 1+x$).

In desorption of the lithium ions, a desorbing solution may be selected from among strong acid solutions including a hydrochloric acid solution, a sulfuric acid solution and a nitric acid solution.

The plurality of desorption reactors may be filled with a desorbing solution selected from among strong acid solutions including a hydrochloric acid solution, a sulfuric acid solution and a nitric acid solution.

The plurality of desorption reactors may include first to third desorption reactors.

As such, according to embodiments of the invention, in the method for adsorption/desorption of lithium ions using a CCD process, brine is forced to sequentially flow backwards inside a plurality of adsorption reactors so as to adsorb lithium ions to an adsorbent, followed by sequentially flowing backwards inside a plurality of desorption reactors to desorb the lithium ions from the adsorbent, thereby achieving an adsorption rate of 65±5% and a desorption rate of 95±3%.

Accordingly, the method for adsorption/desorption of lithium ions enables effective and economically feasible extraction of lithium ions from brine.

BRIEF DESCRIPTION OF THE DRAWINGS

The above and other aspects, features, and advantages of the invention will become apparent from the following detailed description of exemplary embodiments in conjunction with the accompanying drawings, in which.

DETAILED DESCRIPTION

Figure 1:
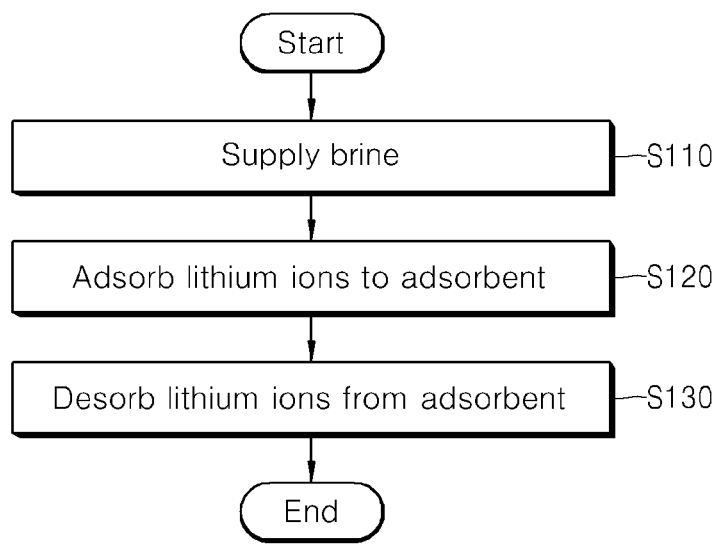
FIG. 1 is a flowchart of a method for adsorption/desorption of lithium ions using a CCD process in accordance with an exemplary embodiment of the present invention.

Exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification and the accompanying drawings.

Hereinafter, a method for adsorption/desorption of lithium ions using a CCD process in accordance with an exemplary embodiment of the present invention will now be described in detail with reference to the accompanying drawings.

Figure 2:
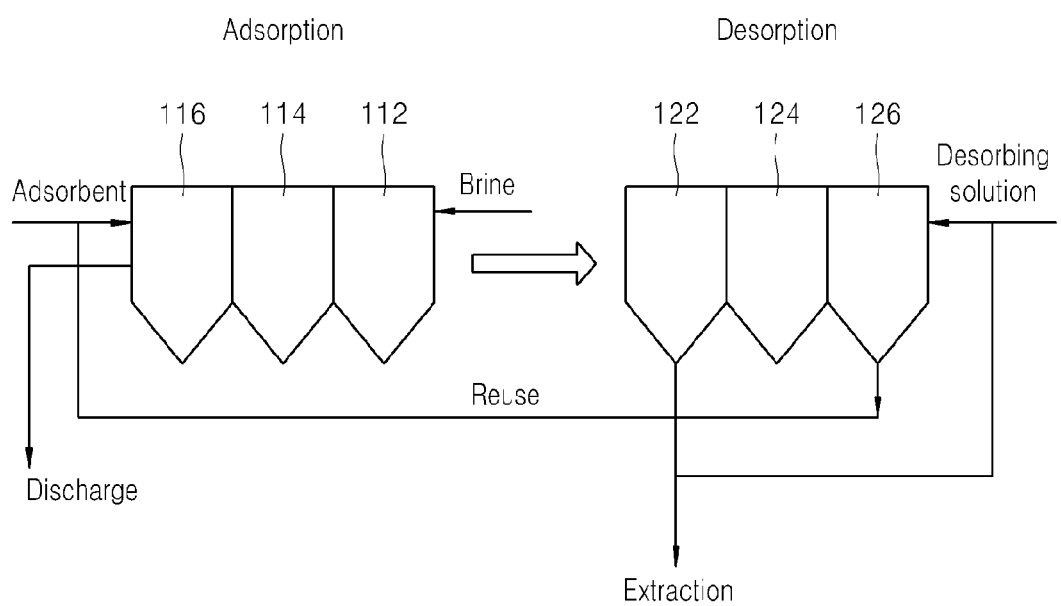
FIG. 2 is a conceptual diagram of a process for adsorption of lithium ions and a process for desorption of lithium ions in the method according to the exemplary embodiment of the present invention.

FIG. 1 is a flowchart of a method for adsorption/desorption of lithium ions using a CCD process in accordance with an exemplary embodiment of the present invention, and FIG. 2 is a conceptual diagram of a process for adsorption of lithium ions and a process for desorption of lithium ions in the method according to the exemplary embodiment.

Referring to FIGS. 1 and 2, the method for adsorption/desorption of lithium ions using a CCD process according to the exemplary embodiment includes a brine supply operation S110, a lithium ion adsorption operation S120, and a lithium ion desorption operation S130.

Brine Supply Operation

In the brine supply operation S110, brine is supplied to one of a plurality of adsorption reactors 112, 114, 116, for example, to an adsorption reactor 112.

The brine is supplied from a brine reservoir (not shown) connected to the adsorption reactor 112. Here, although not shown in the drawings, the brine supplied from the reservoir to the adsorption reactor 112 may be obtained from Lake Uyuni or Lake Atakama in Latin America.

Although not shown in the drawings, the method may further include a magnesium removal operation before or after the brine supply operation S110.

In the magnesium removal operation, magnesium ions $Mg^{2+}$ are removed from the brine. The magnesium ions $Mg^{2+}$ have a smaller size than lithium ions $Li^+$. Thus, since the magnesium ions also tend to be adsorbed together with the lithium ions upon adsorption of the lithium ions described below, there is a need for previous removal of the magnesium ions from the brine before adsorption of the lithium ions.

Removal of the magnesium ions may be performed by settling precipitates of the magnesium ions in the form of magnesium hydroxide, magnesium oxalate, magnesium carbonate, and the like.

Lithium Ion Adsorption Operation

In the lithium ion adsorption operation S120, an adsorbent is supplied to the adsorption reactor 112 to which the brine is supplied, and the brine and the adsorbent are then forced to sequentially flow backwards inside the plurality of adsorption reactors 114, 116 to allow the lithium ions to be adsorbed to the adsorbent during backward flowing.

Figure 3:
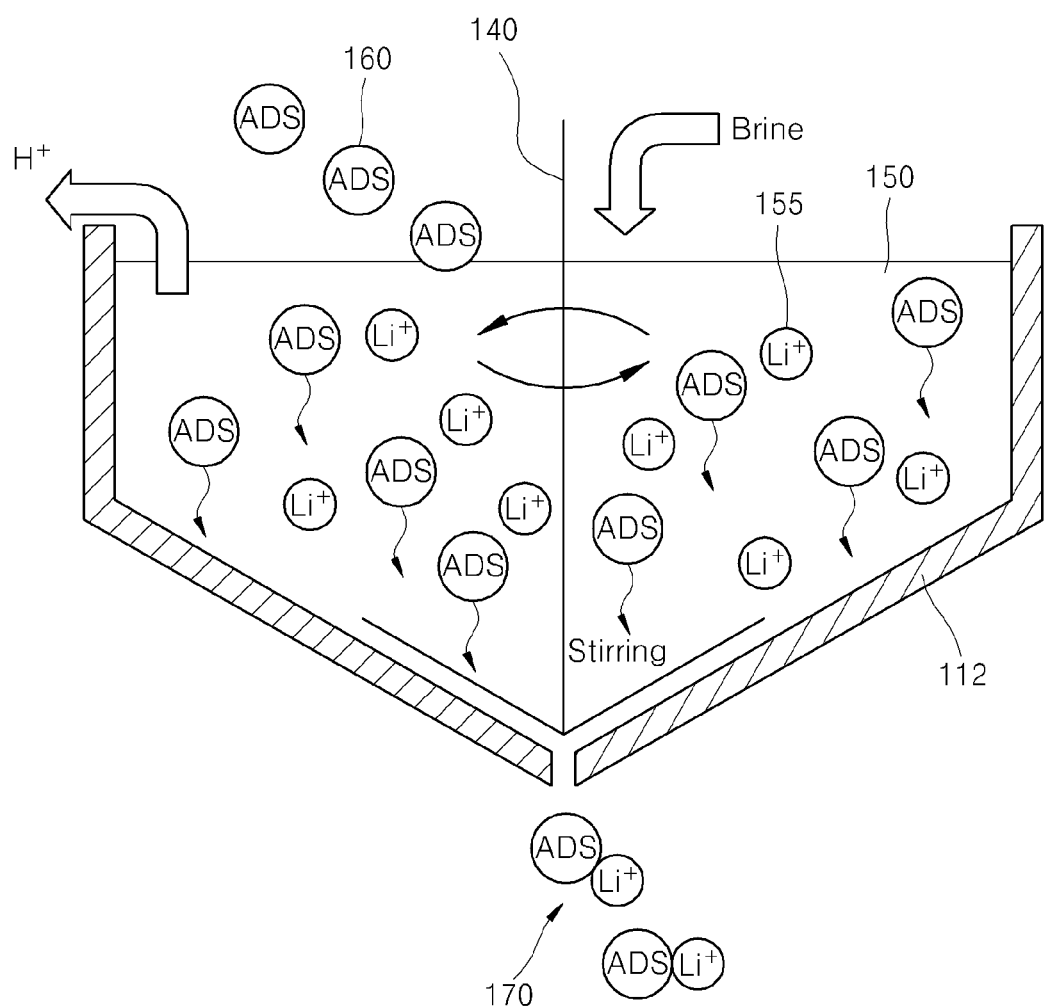
FIG. 3 is a diagram illustrating adsorption of lithium ions in an adsorption reactor in accordance with an exemplary embodiment of the present invention.

FIG. 3 is a diagram illustrating adsorption of lithium ions in an adsorption reactor in accordance with an exemplary embodiment of the present invention.

Referring to FIGS. 2 and 3, an adsorbent 160 may include manganese oxide or aluminum oxide. Preferably, the adsorbent 160 may be composed of manganese oxide which exhibits superior efficiency in adsorption of lithium ions 155 thereto.

Preferably, the adsorbent is a manganese oxide represented by Chemical Formula 1: $H_nMn_{2-x}O_4$ (where $1 \le n \le 1.33$, $0 \le x \le 0.33$, and $n \le 1+x$).

More preferably, the adsorbent is a manganese oxide represented by Chemical Formula 2: $H_{1.33}Mn_{1.67}O_4$.

When such a manganese oxide is used as the adsorbent 160, reaction between the manganese oxide and the brine may be represented by the following reaction formula:

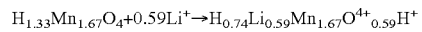

Here, the adsorption reactor 112 is filled with the brine 150 and the adsorbent 160 by a counter current decantation (CCD) process. Herein, the term "CCD process" may be defined as a continuous multi-stage settling separation process which makes a solid current and a liquid current directed opposite to each other when filling a reactor with solid and liquid or when the solid is settled in the reactor.

As such, when supplied to the adsorption reactor 112, the brine 150 and the adsorbent 160 are stirred by a stirrer 140 for a predetermined period of time to maintain the adsorbent 160 in an intermediate state instead of completely settling or completely floating in the adsorption reactor 112, that is, to make the adsorbent floating within about 50% of the total volume of the adsorption reactor 112, whereby the lithium ions 155 are adsorbed to the adsorbent 160 and hydrogen is decomposed and removed from the adsorbent 160.

Here, the adsorbent 160 may have an average particle size of 1~50 μm. If the average particle size of the adsorbent 160 is less than 1 μm, the adsorbent 160 is unlikely to settle even at a predetermined low stirring rate or less due to an excessively fine particle size of the adsorbent. If the average particle size of the adsorbent 160 exceeds 50 μm, a predetermined level of lithium ion adsorption or more cannot be guaranteed due to settlement of the adsorbent even at a predetermined stirring rate or more.

The plurality of adsorption reactors may be constituted by, for example, first, second and third adsorption reactors 112, 114, 116.

Here, the lithium ion adsorption operation may include a primary adsorption operation, a secondary adsorption operation, and a tertiary adsorption operation.

In the primary adsorption operation, the brine 150 and the adsorbent 160 inside the primary adsorption reactor 112 are forced to primarily flow backwards therein, whereby the lithium ions 155 are primarily adsorbed to the adsorbent 160.

In the secondary adsorption operation, a resultant 170 subjected to the primary adsorption operation is supplied to the secondary adsorption reactor 114 and is then forced to secondarily flow backwards therein, whereby the lithium ions 155 are secondarily adsorbed to the adsorbent 160.

In the tertiary adsorption operation, the resultant 170 subjected to the secondary adsorption operation is supplied to the third adsorption reactor 116 and is then forced to tertiarily flow backwards therein, whereby the lithium ions 155 are tertiarily adsorbed to the adsorbent 160.

As such, when supplied to the first to third adsorption reactors 112, 114, 116, the brine 150 and the adsorbent 160 flow backwards in each of the adsorption reactors by the CCD process, which makes the solid current and the liquid current opposite each other, so that the concentration of the lithium ions 155 adsorbed from the brine 150 to the adsorbent 160 may be gradually increased.

Accordingly, in the method for adsorption/desorption of lithium ions according to this embodiment, the adsorption rate of the lithium ions 155 with respect to the adsorbent 160 may be in the range of 65±5% in the final adsorption operation.

Lithium Ion Desorption Operation

In the lithium ion desorption operation S130, the adsorbent 160 having the lithium ions 155 adsorbed thereto, that is, the resultant 170, is forced to sequentially flow backwards inside a plurality of desorption reactors 122, 124, 126, so that the lithium ions 155 are desorbed from the adsorbent 160.

By the lithium ion desorption operation S130, only the lithium ions 155 may be selectively extracted from the brine. At this time, this operation may be performed using a desorbing solution selected from among strong acid solutions including a hydrochloric acid solution, a sulfuric acid solution, and a nitric acid solution.

Here, the plurality of desorption reactors may be constituted by, for example, first, second and third desorption reactors 122, 124, 126.

At this time, when supplied to the first to third desorption reactors 122, 124, 126, the adsorbent 160 having the lithium ions 155 adsorbed thereto flows backwards in each of the desorption reactors by the CCD process, which makes the solid current and the liquid current directed opposite to each other, so that the concentration of the lithium ions 155 desorbed from the adsorbent 160 may be gradually increased.

As a result, in the lithium ion desorption operation S130, the desorption rate of the lithium ions 155 from the adsorbent 160 may be in the range of 95±3%.

Then, the resultant 170 having passed through all of the first to third desorption reactors 122, 124, 126 may be discharged through a discharge port (not shown) or may be returned to the first to third adsorption reactors 112, 114, 116 for reuse.

The method for adsorption/desorption of lithium ions using the CCD process according to the embodiment of the present invention may be carried out through a series of repeated processes.

As such, according to the embodiments of the invention, in the method for adsorption/desorption of lithium ions using a CCD process, brine sequentially flows backwards through a plurality of adsorption reactors to adsorb lithium ions to an adsorbent, followed by sequentially flowing backwards through a plurality of desorption reactors to desorb the lithium ions from the adsorbent, thereby achieving an adsorption rate of 65±5% and a desorption rate of 95±3%.

Accordingly, the method for adsorption/desorption of lithium ions enables effective and economically feasible extraction of lithium ions from brine.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A method for adsorption/desorption of lithium ions using a counter current decantation (CCD) process, comprising:
   supplying brine comprising lithium ions into one adsorption reactor of a plurality of adsorption reactors;
   supplying an adsorbent to the adsorption reactor to which the brine is supplied and adsorbing lithium ions to the adsorbent in the adsorption reactor to which the brine is supplied, and forcing the brine and the adsorbent to sequentially flow backwards inside the respective adsorption reactors; and
   desorbing the lithium ions from the adsorbent by forcing the adsorbent to which the lithium ions are adsorbed to sequentially flow backwards relative to a desorbing solution inside a plurality of desorption reactors,
   wherein the brine and the adsorbent being stirred by a stirrer to maintain the adsorbent floating within a lower 50% volume of a respective adsorption reactor of the plurality of reactors, after supplying the adsorbent to the adsorption reactor to which the brine is supplied, and
   wherein the adsorbent has an average particle size of 1~50 μm.

2. The method of claim 1, wherein the adsorbent comprises manganese oxide or aluminum oxide.

3. The method of claim 2, wherein the manganese oxide is represented by Chemical Formula: $H_nMn_{2-x}O_4$ (where $1 \leq n \leq 1.33$, $0 \leq x \leq 0.33$, and $n \leq 1+x$).

4. The method of claim 1, wherein the desorption of the lithium ions is performed using a desorbing solution selected from a hydrochloric acid solution, a sulfuric acid solution and a nitric acid.

5. The method of claim 1, wherein the plurality of adsorption reactors comprises first to third adsorption reactors.

6. The method of claim 5, wherein the adsorption of the lithium ions comprises:
   primarily adsorbing the lithium ions to the adsorbent by forcing the brine and the adsorbent inside the primary adsorption reactor to primarily flow backwards therein;
   secondarily adsorbing the lithium ions to the adsorbent by supplying a resultant subjected to the primary adsorption to the secondary adsorption reactor and forcing the resultant to secondarily flow backwards therein; and
   tertiarily adsorbing the lithium ions to the adsorbent by supplying the resultant subjected to the secondary adsorption into the third adsorption reactor and forcing the resultant to tertiarily flow backwards therein.

7. The method of claim 1, wherein the plurality of desorption reactor comprises first to third desorption reactors.

8. An apparatus for adsorption/desorption of lithium ions using a counter current decantation (CCD) process, comprising:
   a plurality of adsorption reactors connected to each other to force brine and an adsorbent to sequentially flow backwards in each of the adsorption reactors to adsorb lithium ions to the adsorbent; and
   a plurality of desorption reactors disposed downstream of the plurality of adsorption reactors and connected to each other to force the adsorbent having the lithium ions adsorbed thereto to sequentially flow backwards relative to a desorbing solution inside each of the desorption reactors to desorb the lithium ions from the adsorbent when the adsorbent having the lithium ions is supplied to the plurality of adsorption reactors from the plurality of adsorption reactors through connection lines connected to the plurality of adsorption reactors,
   wherein each adsorption reactor of the plurality of the adsorption reactors comprises a stirrer configured to stir the brine and the adsorbent to maintain the adsorbent floating within a lower 50% volume of a respective adsorption reactor of the plurality of adsorption reactors, and
   wherein the adsorbent has an average particle size of 1~50 µm.

9. The apparatus of claim 8, wherein the adsorbent comprises manganese oxide or aluminum oxide.

10. The apparatus of claim 9, wherein the manganese oxide is represented by Chemical Formula: $H_nMn_{2-x}O_4$ (where $1 \leq n \leq 1.33$, $0 \leq x \leq 0.33$, and $n \leq 1+x$).

11. The apparatus of claim 8, wherein the desorption of the lithium ions is performed using a desorbing solution selected from among strong acid solutions including a hydrochloric acid solution, a sulfuric acid solution and a nitric acid solution.

12. The apparatus of claim 8, wherein the plurality of desorption reactors comprises first to third desorption reactors.

* * * * *